(12) United States Patent
Cho et al.

(10) Patent No.: US 9,432,981 B2
(45) Date of Patent: *Aug. 30, 2016

(54) DOWNLINK CHANNEL TRANSMISSION METHOD AND APPARATUS AND COMMON CHANNEL RECEPTION METHOD AND APPARATUS IN CELLULAR COMMUNICATION SYSTEM SUPPORTING BANDWIDTH SCALABILITY

(71) Applicant: Samsung Electronics Co., Ltd., Gyeonggi-do (KR)

(72) Inventors: Joon Young Cho, Gyeonggi-do (KR); Jin Kyu Han, Seoul (KR); Ju Ho Lee, Gyeonggi-do (KR); Youn H. Heo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 178 days.

This patent is subject to a terminal disclaimer.

(21) Appl. No.: 13/950,959

(22) Filed: Jul. 25, 2013

(65) Prior Publication Data

US 2014/0003376 A1    Jan. 2, 2014

Related U.S. Application Data

(63) Continuation of application No. 13/120,552, filed as application No. PCT/KR2009/005298 on Sep. 17, 2009, now Pat. No. 8,521,151.

(30) Foreign Application Priority Data

Sep. 23, 2008  (KR) ................. 10-2008-0093184

(51) Int. Cl.
*H04L 1/00* (2006.01)
*H04W 72/04* (2009.01)
*H04W 56/00* (2009.01)
*H04J 11/00* (2006.01)

(52) U.S. Cl.
CPC ........... *H04W 72/042* (2013.01); *H04W 56/00* (2013.01); *H04J 11/0069* (2013.01)

(58) Field of Classification Search
CPC ... H04W 72/04; H04W 72/05; H04W 72/06; H04W 80/04; H04W 80/05; H04W 80/06; H04W 80/07; H04W 80/08; H04W 52/40; H04W 52/41; H04W 52/42
USPC ....... 370/329, 334, 204, 201, 350, 328, 349, 370/310; 455/434, 450, 550.1, 522, 127.1, 455/422.1, 507
See application file for complete search history.

(56) References Cited

U.S. PATENT DOCUMENTS

2007/0217440 A1* 9/2007 Cho et al. .................... 370/431

FOREIGN PATENT DOCUMENTS

KR    1020070081398    8/2007

OTHER PUBLICATIONS

LTE—Advance-Evolving LTE towards IMT-Advance by Parkvall et al. Mar. 20, 2009.*

(Continued)

*Primary Examiner* — Dady Chery
(74) *Attorney, Agent, or Firm* — The Farrell Law Firm, P.C.

(57) ABSTRACT

Methods and apparatuses for transmitting and receiving a signal in a mobile communication system are provided. The method for receiving a signal at a User Equipment (UE) in the mobile communication system includes receiving, from a Base Station (BS), configuration information indicating whether a Broadcasting Channel (BCH) and a Synchronization Channel (SCH) are allocated in at least one subband; receiving, from the BS, a downlink control channel; and receiving, from the BS, a downlink data channel, based on the configuration information and the downlink control channel.

16 Claims, 11 Drawing Sheets

(56) References Cited

OTHER PUBLICATIONS

LTE—Advance-Evolving LTE towrds IMT-Advance by Parkvall et al. Mar. 8, 2008.*

Jim Zyren, Overview of the 3GPP Long Term Evolution Physical Layer, Freescale Semiconductor, Jul. 2007.

* cited by examiner

DOWNLINK CHANNEL TRANSMISSION METHOD AND APPARATUS AND COMMON CHANNEL RECEPTION METHOD AND APPARATUS IN CELLULAR COMMUNICATION SYSTEM SUPPORTING BANDWIDTH SCALABILITY

PRIORITY

This application is a Continuation Application of U.S. application Ser. No. 13/120,552, which was filed in the U.S. Patent and Trademark Office on Mar. 23, 2011, and claims priority to International Appl. No.: PCT/KR2009/005298 filed Sep. 17, 2009, and to Korean Patent Application No. 10-2008-0093184 filed on Sep. 23, 2008, the content of each of which is incorporated herein by reference.

BACKGROUND OF THE INVENTION

1. Field of the Invention

The present invention relates to a cellular communication system and, in particular, to methods and apparatuses for transmitting and receiving downlink common channels such as synchronization channel and broadcast channel in a cellular communication system supporting bandwidth scalability.

2. Description of the Related Art

Recently, Orthogonal Frequency Division Multiplexing (OFDM) is becoming very popular for broadcast and communication systems. OFDM is advantageous to reduce Intersymbol interference and fading caused by multipath propagation and improve spectral efficiency with a large number of closely spaced orthogonal subcarriers. With these advantageous features, OFDM is regarded as a promising solution for high speed data transmission and broadband communication system and superior compared to Direct Sequence Code Division Multiple Access (DS-CDMA) technology.

FIG. 1 is a diagram illustrating an OFDM-based downlink frame structure in Evolved Universal Terrestrial Radio Access (EUTRA) specified in the 3rd Generation Partnership Project (3GPP) standards. Referring to FIG. 1, the 20 MHz system bandwidth 101 is divided into 100 Resource Blocks (RBs) 105. An RB consists of 12 consecutive subcarriers 103 by 14 OFDM symbol periods. Each subcarrier 103 for one OFDM symbol duration carries a modulation symbol of downlink channel. Each box within the resource grid representing a single carrier for one symbol period is referred to as a Resource Element (RE) 106. In FIG. 1, the RB is composed of total 168 REs (14 OFDM symbols×12 subcarriers). A single downlink data channel can be assigned one or more RBs for one OFDM symbol duration 104 according to the data rate.

In the cellular communication system, bandwidth scalability is one of the key performance attributes for providing high speed wireless data service. For instance, the Long Term Evolution (LTE) system supports various bandwidths of 20 MHz, 15 MHz, 10 MHz, 5 MHz, 3 MHz, and 1.4 MHz as shown in FIG. 2. Accordingly, the LTE service provider can select one of the available bandwidths, and a mobile terminal also can be configured to support various capacities of 1.4 MHz to 20 MHz bandwidth. In order to fulfill IMT-Advanced requirements, LTE-Advanced (LTE-A) supports carrier aggregation to allocate up to 10 MHz.

In the system supporting the bandwidth scalability, the mobile terminal is required to be able to carry out the initial cell search without information on the system bandwidth. The mobile terminal can acquire synchronization to the base station and cell ID for demodulation of data and control information through cell search procedure. The system bandwidth information can be acquired from the Synchronization Channel (SCH) in the cell search procedure or by demodulating a Broadcast Channel (BCH) after the cell search procedure. The BCH is a channel used for transmitting the system information of the cell which the mobile terminal accesses and is demodulated first right after the cell search procedure. The mobile terminal can acquire the system information such as the system bandwidths, System Frame Number (SFN), and physical channel configuration of the cell by receiving a shared control channel.

FIG. 2 is a diagram illustrating an exemplary frequency resource mapping of SCH and BCH according to a system bandwidth in a conventional system supporting bandwidth scalability. The mobile terminal performs cell search on the SCH and, once the cell search has completed successfully, acquires the system information on the cell through the BCH. In FIG. 2, the horizontal axis 200 denotes frequency in MHz, and the SCH 204 and BCH 206 having 1.08 MHz bandwidth are transmitted in the middle of the system bandwidth regardless of the bandwidth scale. Accordingly, the mobile terminal can find the RF carrier 202 regardless of the bandwidth scale of the system and acquire an initial synchronization to the system by performing the cell search on the SCH 204 defined by 1.08 MHz bandwidth centering on the RF carrier 202. After finding the cell, the mobile terminal demodulates the BCH 206 transmitted within the same 1.08 MHz bandwidth centering on the RF carrier 202 to acquire the system information.

FIG. 3 is a diagram illustrating a frame format of a 10 ms radio frame of an LTE system in which the SCH and BCH are transmitted. The SCH is transmitted in the forms of Primary Synchronization Signal (PSS) and Secondary Synchronization Signal (SSS) on every 0th subframe (subframe #0) and every 5th subframe (subframe #5). Each of the PSS and SSS has a length equal to an OFDM symbol duration and transmitted through 1.08 MHz bandwidth in the middle of the system bandwidth 303 as shown in FIG. 2. The BCH 302 is transmitted for four OFDM symbol durations within the subframe #0.

The LTE-A system supports a bandwidth wider than the LTE system for supporting high speed data transmission and should be implemented to provide backward compatibility for the LTE terminals to access the LTE-A system. For this purpose, it is required to divide the downlink band of the LTE-A system into subbands for the LTE terminals and transmit the SCH and BCH through all the subbands. In this case, however, the SCH and BCH are transmitted redundantly from the viewpoint of the LTE terminal having the capability supporting the entire system bandwidth of the LTE-A system.

SUMMARY OF THE INVENTION

In order to overcome the above problems of the prior art, the present invention provides methods and apparatuses for transmitting and receiving common control channels such as the SCH and BCH in a cellular communication system using carrier aggregation to increase system capability.

Also, the present invention provides common channel transmission and reception methods and apparatuses for a cellular communication system supporting bandwidth scalability that are capable of reducing common channel overhead particularly to the mobile terminals supporting higher bandwidth capacity such as LTE-A UEs.

Also, the present invention provides common channel transmission and reception methods and apparatuses for a cellular communication system supporting bandwidth scalability that is capable of efficiently signaling the common control channel information from the base station to the mobile terminal.

According to an aspect of the present invention, a method for receiving a signal at a User Equipment (UE) in a mobile communication system is provided. The method includes receiving, from a Base Station (BS), configuration information indicating whether a Broadcasting Channel (BCH) and a Synchronization Channel (SCH) are allocated in at least one subband; receiving, from the BS, a downlink control channel; and receiving, from the BS, a downlink data channel, based on the configuration information and the downlink control channel.

According to another aspect of the present invention, a method for transmitting a signal at a Base Station (BS) in a mobile communication system is provided. The method includes transmitting, to a User Equipment (UE), configuration information indicating whether a Broadcasting Channel (BCH) and a Synchronization Channel (SCH) are allocated in at least one subband; transmitting, to the UE, a downlink control channel; and transmitting, to the UE, a downlink data channel, based on the configuration information and the downlink control channel.

According to another aspect of the present invention, a User Equipment (UE) of a mobile communication system is provided. The UE includes a transceiver which transmits and receives signals to and from a Base Station (BS); and a control configured to receive configuration information from the BS and receive a downlink control channel from the BS and receive a downlink data channel, based on the configuration information and the downlink control channel, from the BS, configuration information indicating whether a Broadcasting Channel (BCH) and a Synchronization Channel (SCH) are allocated in at least one subband.

According to another aspect of the present invention, a Base Station (BS) of a mobile communication system is provided. The BS includes a transceiver which transmits and receives signals to and from a User Equipment (UE); and a control unit configured to transmit configuration information to the UE and transmitting a downlink control channel to the UE and transmitting a downlink data channel, based on the configuration information and the downlink control channel, to the UE, configuration information indicating whether a Broadcasting Channel (BCH) and a Synchronization Channel (SCH) are allocated in at least one subband.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms used in the following descriptions are defined in consideration of the corresponding functions in the present invention and thus can be replaced with other words according to the intention and practice of user and operator. Accordingly, the definitions of the terms should be made based on the contents through the entire description of the present invention.

While the following embodiments are directed to the common channel transmission technique for the OFDM-based communication system, particularly abiding by the 3GPP EUTRA standard, it can be understood to those skilled in the art that the common channel transmission technique can be applied to other types of communication systems having the similar technical background and channel format with a slit modification without departing from the sprit and scope of the invention.

The main object of the present invention is to provide the methods and apparatuses for transmitting and receiving common control channels such as SCH and BCH in the cellular communication system using carrier aggregation technique to increase system capability. Particularly in the LTE-A system aggregating multiple LTE carriers to support transmission bandwidths of up to 100 MHz, the common control channel transmission and reception methods and apparatus of the present invention enables the LTE-A UEs communicate date with high spectral efficiency and low common channel overhead while maintaining backward compatibility to the LTE UEs.

The downlink physical channel transmission and reception methods and apparatuses of the present invention are described hereinafter with the exemplary embodiments.

First Embodiment

Figure 1:
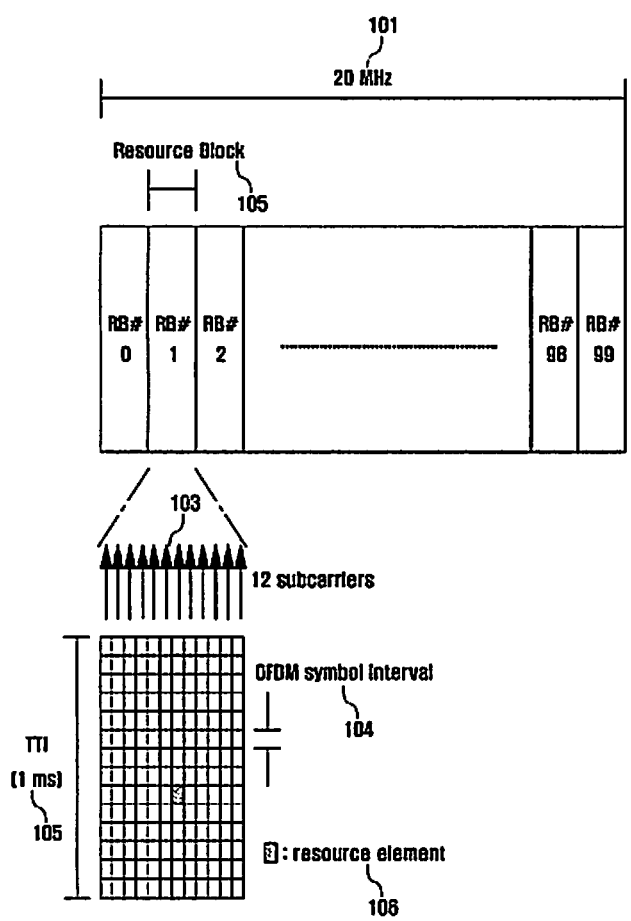
FIG. 1 is a diagram illustrating an OFDM-based downlink frame structure in Evolved Universal Terrestrial Radio Access (EUTRA) specified in the 3rd Generation Partnership Project (3GPP) standards.
Figure 2:
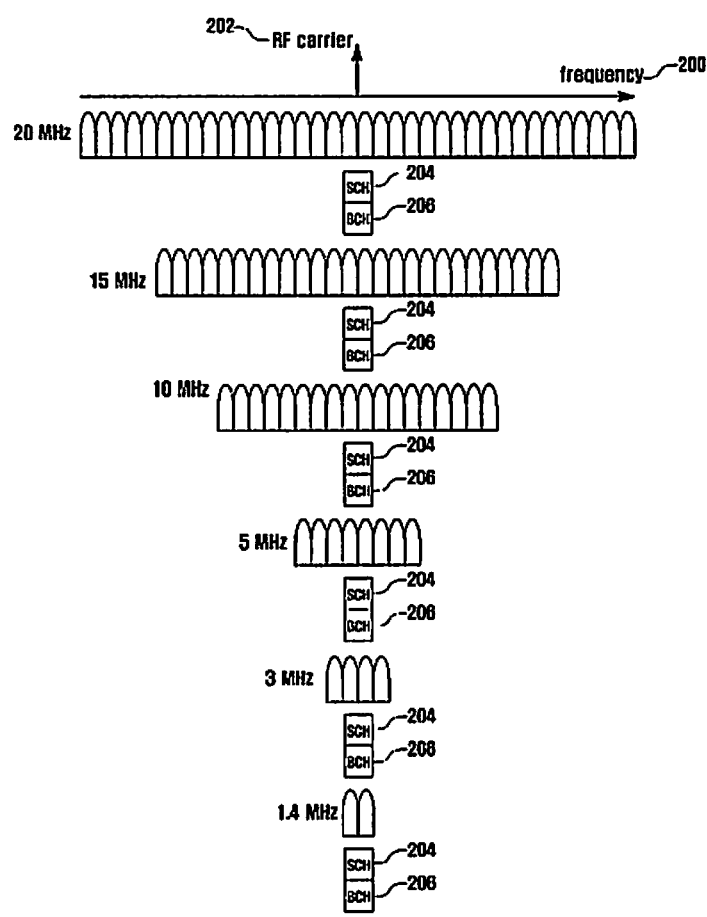
FIG. 2 is a diagram illustrating an exemplary frequency resource mapping of SCH and BCH according to a system bandwidth in a conventional system supporting bandwidth scalability.
Figure 3:
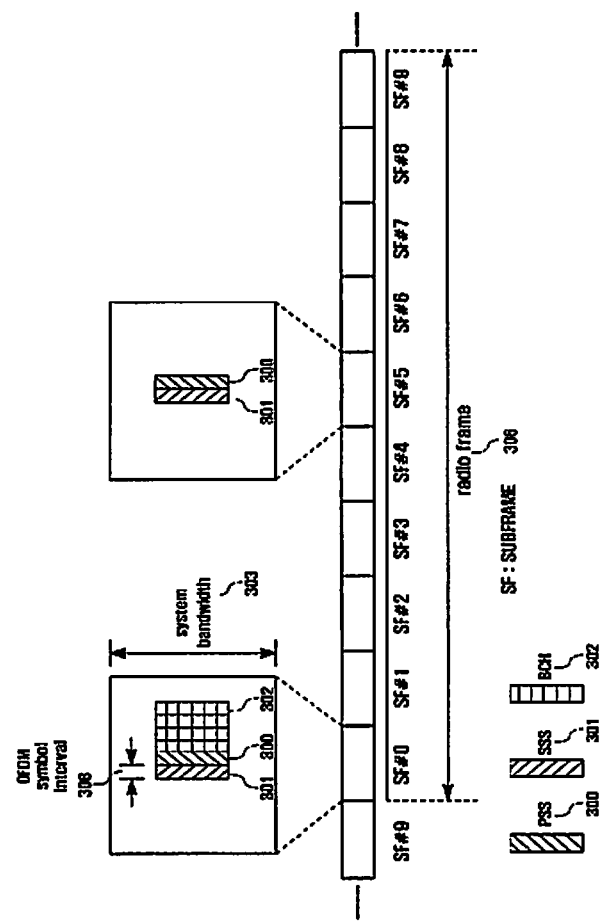
FIG. 3 is a diagram illustrating a frame format of a 10 ms radio frame of an LTE system in which the SCH and BCH are transmitted.
Figure 4:
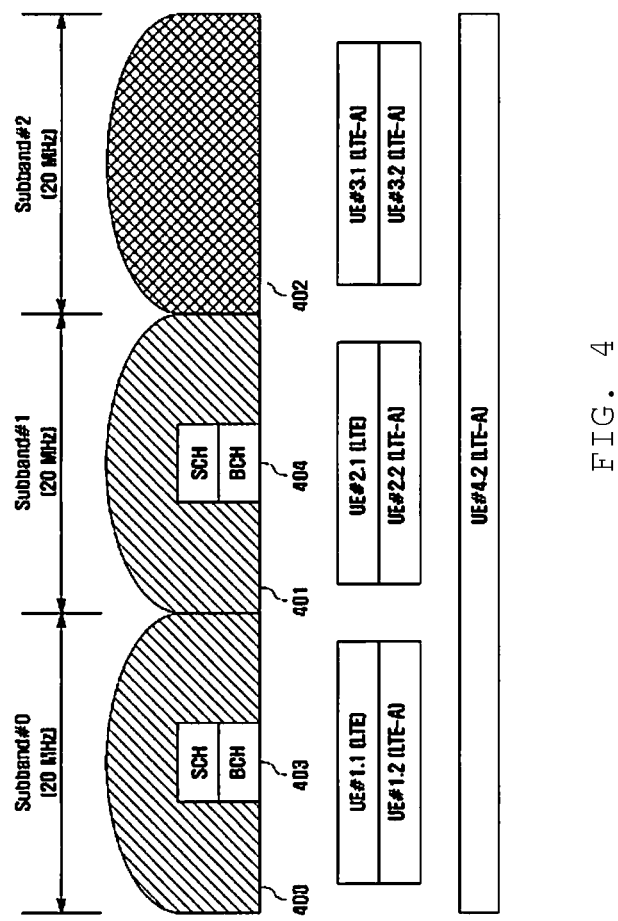
FIG. 4 is a diagram illustrating a structure of a system bandwidth of an LTE-A system according to the first embodiment of the present invention.

FIG. 4 is a diagram illustrating a structure of a system bandwidth of an LTE-A system according to the first embodiment of the present invention. In FIG. 4, the system bandwidth of the LTE-A system is 60 MHz, and the system band is composed of three 20 MHz subbands 400, 401, and 402. Each of the subbands 400 and 401 is configured to transmit the SCH and BCH 403 (or 404) in the middle of its bandwidth. Unlike the subbands 400 and 401, the subband 402 is configured without transmission of the common control channels. The bandwidth configuration of FIG. 4 is depicted as an example, and the present invention can be applied when the subbands and SCH and BCH are configured in different manner within the same system band.

In FIG. 4, plural UEs are depicted below the corresponding subbands 400, 401, and 402 on which the UEs camp. For instance, the UE #1.1, which is an LTE UE, receives the SCH and BCH 403 in the initial cell search procedure and camps on the subband #0 400 so as to receive downlink data within the 20 MHz band of the subband #0. Similarly, the UE #1.2, which is an LTE-A UE, camps on the subband #0 400 having 20 MHz bandwidth. Although the UE #1.1 and UE #1.2 are depicted in association with the subband #0 400, further LTE and/or LTE-A UEs can camp on the subband #0 400, and the number of UEs to camp on each subband is not restricted in the first embodiment of the present invention. Similarly, the UE #2.1, which is an LTE UE, receives the SCH and BCH 404 in the initial cell search procedure and camps on the subband #1 401. The UE #4.1, which is an LTE-A UE supporting 60 MHz bandwidth, can receive data through at least one of the subband #0 400, subband #1 401, and subband #2 402. The UE #4.1 can perform the cell search with the SCH transmitted on the subband #0 or subband #1 and camp on the system band to receive the data using the entire 60 MHz bandwidth. The system band camp-on procedure of the LTE-A UE such as UE #4.1 is described later with reference to FIG. 6.

Figure 5:
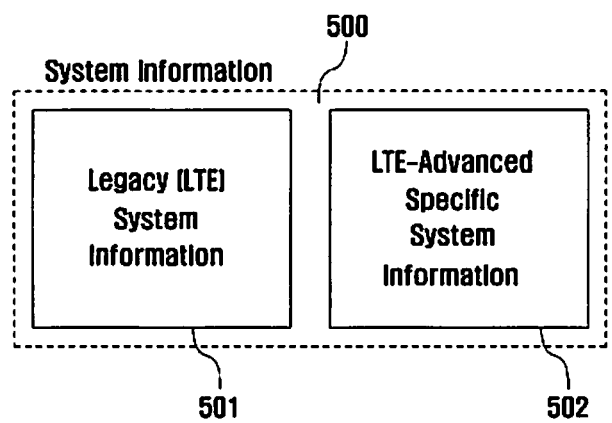
FIG. 5 is a diagram illustrating a format of SI transmitted by the LTE-A system according to an exemplary embodiment of the present invention.

In case of subband #2 402, neither the SCH nor the BCH is transmitted, whereby the LTE UEs cannot camp on the subband #2 to receive service. However, the LTE-A UEs such as UE #3.1 and UE #3.2 can receive the System Information (SI) formatted as shown in FIG. 5 and camp on the subband #2 402 to receive service. The afore-mentioned capacity-specific camp-on procedure is described in more detail with reference to FIGS. 5 and 6.

FIG. 5 is a diagram illustrating a format of SI transmitted by the LTE-A system according to an exemplary embodiment of the present invention.

Referring to FIG. 5, the SI 500 includes LTE-A specific system information 502 as well as the legacy LTE system information 501 carried by the BCH. For instance, the cell configuration parameters related to the random access channel and the physical channels such as Physical Downlink Control Channel (PDCCH) and Physical Downlink Shared Channel (PDSCH) can be carried by the SI 500. The individual subbands depicted in FIG. 4 can be configured such that the UEs can receive the SI 500 formatted as shown in FIG. 5 on the downlink physical data channels. The SI 500 transmitted in the LTE-A system provides the UEs with the LTE-A specific system information 502 in addition to the legacy LTE system information 501 provided in the legacy LTE system. Accordingly, the LTE UEs receives only the legacy LTE system information 501, while the LTE-A UEs receives the LTE-A specific system information 502 as well as the legacy LTE system information 501. For instance, the information about the 60 MHz system bandwidth and three 20 MHz subbands constituting the 60 MHz system band is included in the LTE-A specific system information 502 such that only the LTE-A UEs can receive the LTE-A specific system information 502. The LTE-A specific system information 502 can include the information indicative of no SCH and BCH on subband #2. The SI 500 can be received on the SI channel periodically transmitted within the cell or received through a dedicated Radio Resource Control (RRC) upper layer signaling.

Figure 6:
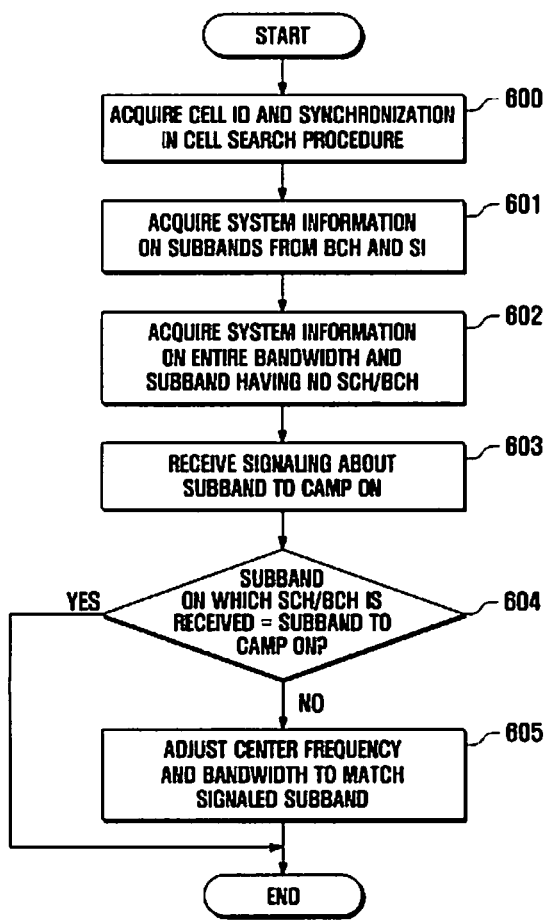
FIG. 6 is a flowchart illustrating a camp-on procedure of the common channel transmission method in an LTE-A system supporting bandwidth scalability according to the first embodiment of the present invention.

FIG. 6 is a flowchart illustrating a camp-on procedure of the common channel transmission method in an LTE-A system supporting bandwidth scalability according to the first embodiment of the present invention. In the LTE-A system according to the first embodiment of the present invention, the LTE UEs performs only steps 600 and 601 of FIG. 6 but not the rest steps. That is, only the LTE-A UEs performs the entire steps from 600 to 605 of the camp-on procedure predicted in FIG. 6.

Referring to FIG. 6, the LTE-A UE acquires cell ID from the SCH transmitted on the corresponding subband and frequency and frame synchronization in the cell search procedure (600). Next the LTE-A UE acquires the information about the bandwidths of the subband acquired at step 601, a number of transmission antennas, and configuration of random access channel from the BCH and SI (601). Next, the LTE-A UE acquires the LTE-A specific system information through the SI 500 of FIG. 5 or a dedicated RRC upper layer signaling (602). From the SI 500 or the dedicated RRC upper layer signaling, the LTE-A UE can acquire the information about the entire system bandwidth, subbands constituting the system band and respective bandwidths of the subbands, presence of the SCH and BCH in each subband. Next, the LTE-A UE receives a signaling indicative of the subband on which it camps (603). Referring to the exemplary case of FIG. 4, the UE #3.1 receives a signal instructing to camp on the subband #2 402, and the UE #4.1 receives a signal instructing to camp on the subband #0 400, subband #1 401, and subband #2 402 simultaneously.

Once the camp-on instruction signal is received, the LTE-A UE determines whether the subband instructed to camp on is identical with the subband on which the SCH and BCH are received (604). If the subband instructed to camp on is identical with the subband on which the SCH and BCH, the LTE-A UE sets the reception bandwidth equal to the subband instructed to camp on according to the system information acquired at step 601. Otherwise, if the subband instructed to camp on is different from the sub band on which the SCH and BCH are received, the LTE-A UE adjusts the center frequency and bandwidth of the reception frequency band to match with the subband instructed to camp on (605). Referring to the exemplary case of FIG. 4, if the UE #3.1 receives the SCH on the subband #1 401 in the cell search process at step 600, the UE #3.1 adjusts the center frequency and bandwidth of the reception band to be identical with those of the subband #2 401. In case of UE #4.1, it sets the reception bandwidth to 60 MHz and sets the center frequency of the 60 MHz bandwidth to the center frequency of the subband #1 401.

Figure 7:
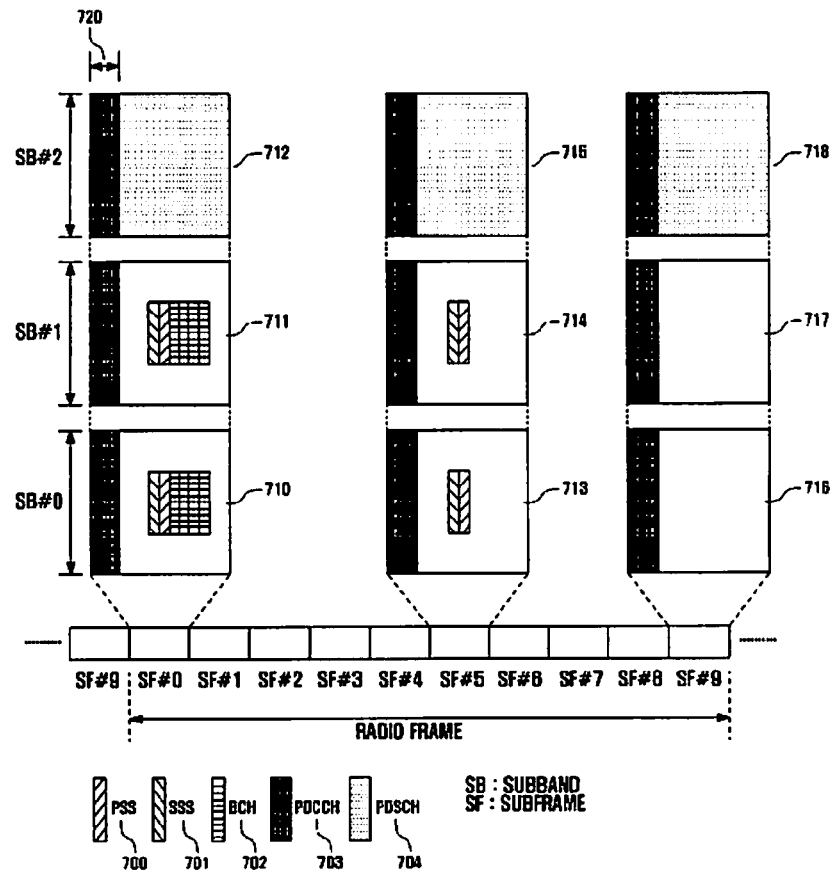
FIG. 7 is a diagram illustrating a frame format of a radio frame for use in an LTE-A system according to an exemplary embodiment of the present invention.

FIG. 7 is a diagram illustrating a frame format of a radio frame for use in an LTE-A system according to an exemplary embodiment of the present invention. As shown in FIG. 7, the SCH, BCH, PDCCH, and PDSCH are transmitted on the individual respective subbands.

Referring to FIG. 7, the subband #0 710 and subband #1 711 during the subframe #0 carry the SCH 700 and 701 and BCH 702 in an OFDM system duration for transmitting the PDSCH 704 such that the REs allocated for those channels cannot used for transmission of the PDSCH 704. However, the subband #2 712 during the subframe #0 is dedicated to the LTE-A UEs without resource allocation for the SCH and BCH such that the more resources can be used for transmission of the PDSCH 704 during the subframe #0. Accordingly, the subband #2 is superior to the subband #0 710 and the subband #1 711 during the subframe #0 in view of the PDSCH 704. This is an advantage obtained because the subband #2 is configured to be dedicated to the LTE-A UEs. Although not depicted in FIG. 7, reference signals (RSs) used in downlink channel estimation for demodulating the PDSCH are included in the PDSCH 704. Meanwhile, in the subband #0 713 and the subband #1 714 during the subframe #5, the REs allocated for the BCH in the subband #0 710 and the subband #1 711, except for the REs for SCH 700 and 701, during the subframe #0 are used for the transmission of the PDSCH 704. The subband #2 715 during the subframe #5 has no REs allocated for the SCH and BCH as during the subframe #0 such that entire REs can be used for transmission of the PDCCH 703 and PDSCH 704.

Regardless of the subband, no SCH and BCH are transmitted during the rest subframes (subframe #1 to subframe #4 and subframe #6 to subframe #9) such that entire REs of OFDM symbol durations designated for the PDSCH can be used for transmission of the PDSCH 704 as shown in the subband #0 716, subband #1 717, and subband #2 718 during the rest subframes. Although it is depicted that the PDCCH 703 are transmitted in the same OFDM symbol durations of all the subframes, the number of OFDM symbols for transmitting the PDCCH can be configured differently according to the subband or subframe.

Figure 8:
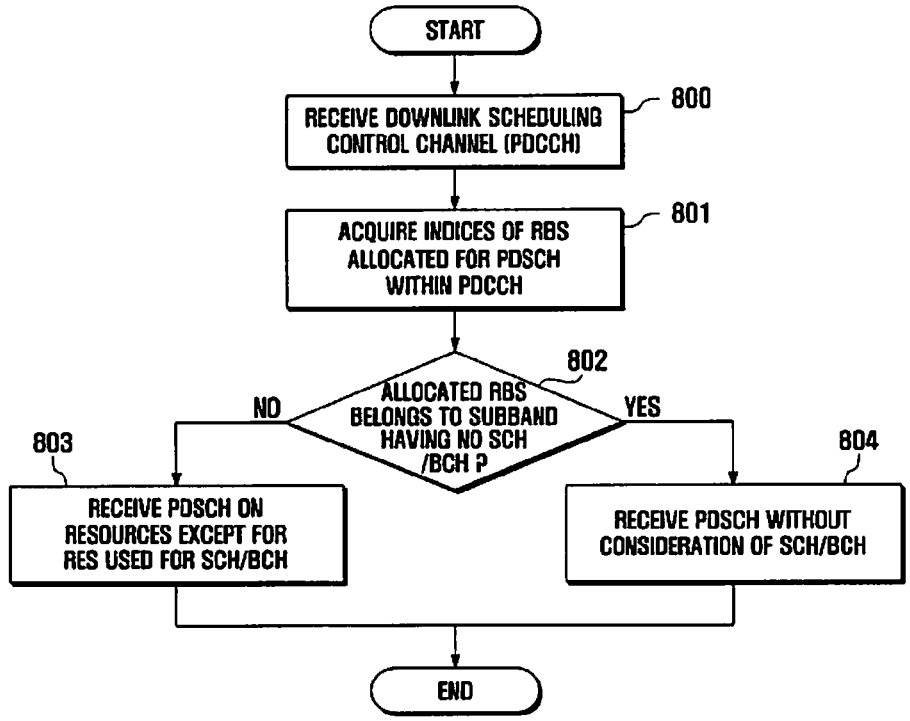
FIG. 8 is a flowchart illustrating a procedure for an LTE-A UE to receive data on the PDSCH in the LTE-A system according to an exemplary embodiment of the present invention.

FIG. 8 is a flowchart illustrating a procedure for an LTE-A UE to receive data on the PDSCH in the LTE-A system according to an exemplary embodiment of the present invention.

Referring to FIG. 8, the LTE-A UE receives a PDCCH every subframe and determines whether any data scheduled for it exists within the subframe (800). The data scheduled for the LTE-A UE can be identified by using the UE ID contained in the PDCCH. Next, the LTE-A UE extracts the indices of the RBs allocated for the PDSCH from an RB index field of the PDCCH (801). Next, the LTE-A UE determines whether the SCH and BCH are transmitted on the subband to which the RBs belongs (802). If neither SCH nor BCH is transmitted on the subband (i.e. if the RBs belongs to the subband which does not carry the SCH and BCH), the LTE-A UE receives the PDSCH without consideration of the SCH and BCH (804). That is, the LTE-A UE can receive data transmitted using the entire resources of the PDSCH in the subframe #1 to subframe #4 and subframe #6 to subframe #9 since neither SCH nor BCH exists in the PDCCH of those subframes. Otherwise, if the scheduled RBs belong to the subband in which both the SCH and BCH or the SCH is transmitted, the LTE-A UE receives the data transmitted on the resources except for the REs used for the SCH and BCH within the PDSCH (803). That is, the LTE-A UE receives the data on the PDSCH except for the REs used for the SCH and BCH in the subframe #0 and the subframe #5.

Figure 9:
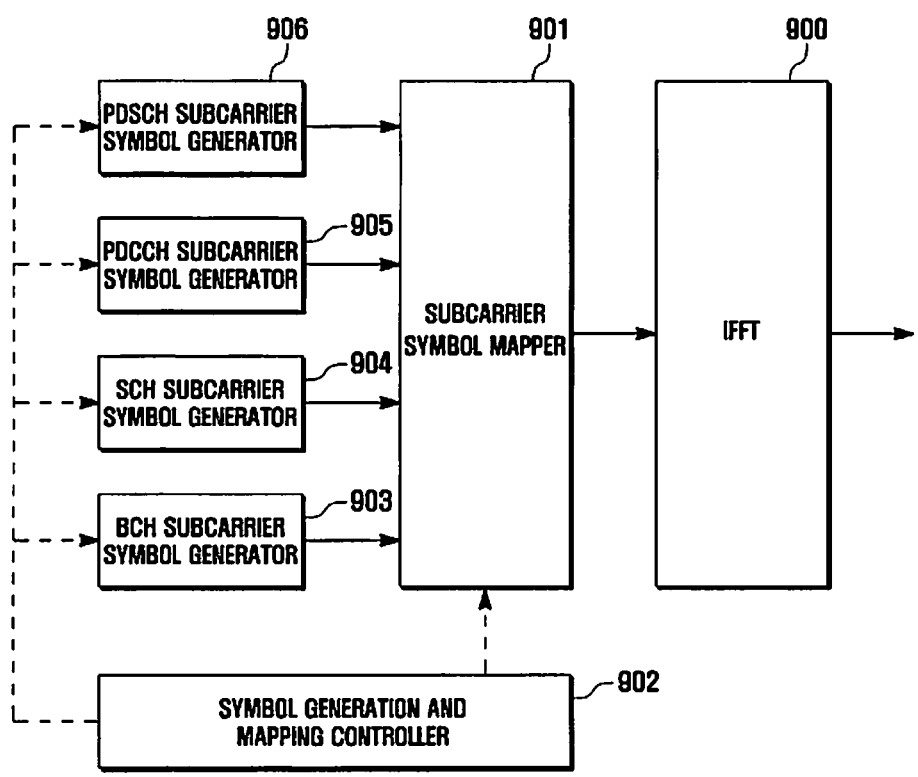
FIG. 9 is a block diagram illustrating a configuration of a base station transmitter for transmitting downlink physical channels in LTE-A system according to the first embodiment of the present invention.

FIG. 9 is a block diagram illustrating a configuration of a base station transmitter for transmitting downlink physical channels in LTE-A system according to the first embodiment of the present invention.

Referring to FIG. 9, the base station transmitter includes a BCH subcarrier symbol generator 903 for generating BCH subcarrier symbols, a SCH subcarrier symbol generator 904 for generating SCH subcarrier symbols, a PDCCH subcarrier symbol generator 905 for generating PDCCH subcarrier symbols, and a PDSCH subcarrier symbol generator 906 for generating PDSCH subcarrier symbol. The symbols generated by the symbol generators are mapped by a subcarrier symbol mapper 901. That is, the subcarrier symbol mapper 901 maps the symbols generated by the symbol generators 903, 904, 905, and 906 to the corresponding input ports of the Inverse Fast Fourier Transformer (IFFT) 900. At this time, a symbol generation and mapping controller 902 controls the subcarrier symbol mapper 901 to map the symbols of the corresponding subframes or subbands to the correct input ports of the IFFT 900. Referring to the exemplary case of FIG. 4 in which the subband #2 402 of FIG. 4 does not carry the SCH and BCH subcarrier symbol, the symbol generation and mapping controller 902 controls the subcarrier symbol mapper 901 such that the PDSCH symbols are mapped to the input ports of the IFFT 900 on behalf of the SCH and BCH symbols.

Figure 10:
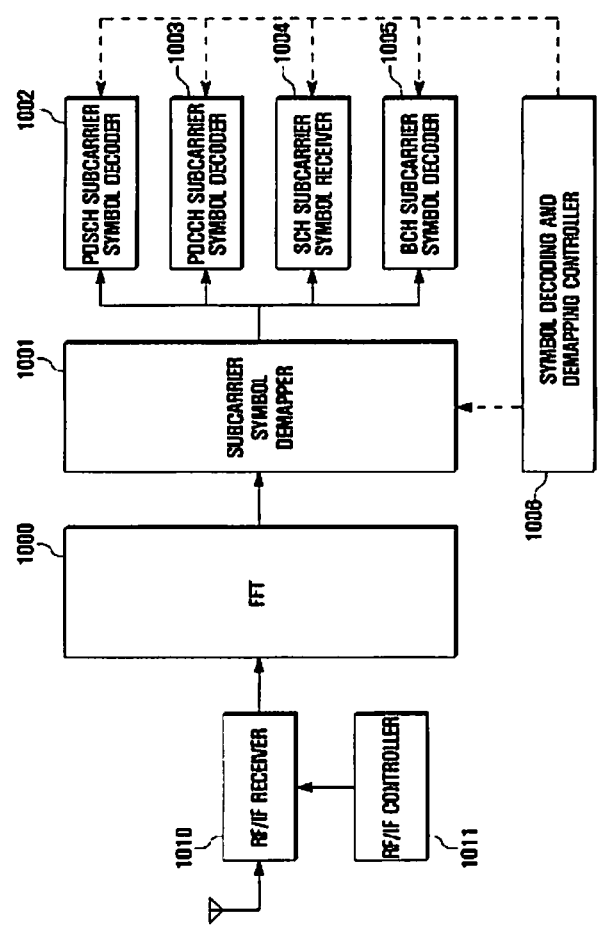
FIG. 10 is a block diagram illustrating a configuration of a LTE-A UE receiver for receiving downlink physical channel in LTE-A system according to the first embodiment of the present invention.

FIG. 10 is a block diagram illustrating a configuration of a LTE-A UE receiver for receiving downlink physical channel in LTE-A system according to the first embodiment of the present invention.

The LTE-A UE receiver includes an Radio Frequency/Intermediate Frequency (RF/IF) receiver 1010, an RF/IF controller 1011, a Fast Fourier Transformer (FFT) 1000, a subscriber symbol demapper 1001, a PDSCH subcarrier symbol decoder 1002, a PDCCH subcarrier symbol decoder 1003, a SCH subcarrier symbol receiver 1004, a BCH subcarrier symbol decoder 1005, and a symbol decoding and demapping controller 1006.

Referring to FIG. 10, the RF/IF receiver 1011 configures the bandwidth and center frequency of the reception bandwidth for the LTE-A UE to receive downlink signals through the subband on which the LTE-A UE camps on under the control of the RF/IF controller 1011. The FFT 1000 performs Fourier transformation on the downlink OFDM signals and outputs the received subcarrier symbols. The received subcarrier symbols are output to the corresponding decoders by means of the symbol demapper 1001. The PDSCH subcarrier symbol decoder 1002, PDCCH subcarrier symbol decoder 1003, and BCH subcarrier symbol decoder 1005 perform decoding on the corresponding subcarrier symbols output by the symbol demapper 101 to recover the transmitted data. The SCH subcarrier symbol receiver 1004 receives the SCH symbols output by the subcarrier symbol demapper 1001 and performs synchronization function base on the information contained in the SCH symbols. That is, the LTE-A UE performs correlates the received PSS/SSS to the available PSS/SSS sequences to find the PSS/SSS sequence of the current cell and acquire synchronization with the cell in the cell search procedure. The decoding and demapping controller 1006 controls the subcarrier symbol demapper 1001 to demap the output of the FFT 1000 and output the demapped symbols to the corresponding decoders. Referring to the exemplary case of FIG. 4 in which the subband #2 402 of FIG. 4 does not carry the SCH and BCH subcarrier symbol, the decoding and demapping controller 1006 controls the subcarrier symbol demapper 1001 to demap the PDCCH from the subcarriers designated for the SCH and BCH even during the subframe #0 and subframe #5.

In FIG. 10, the RF/IF controller 1011 can be a controller, which controls entire operation of the LTE-A UE, and the decoding and demapping controller 1006 can be a signal processor for processing the signals handled in the LTE-A UE. Also, the RF/IF controller 1011 and the decoding and demapping controller 1006 can be integrated into a single device.

Second Embodiment

Figure 11:
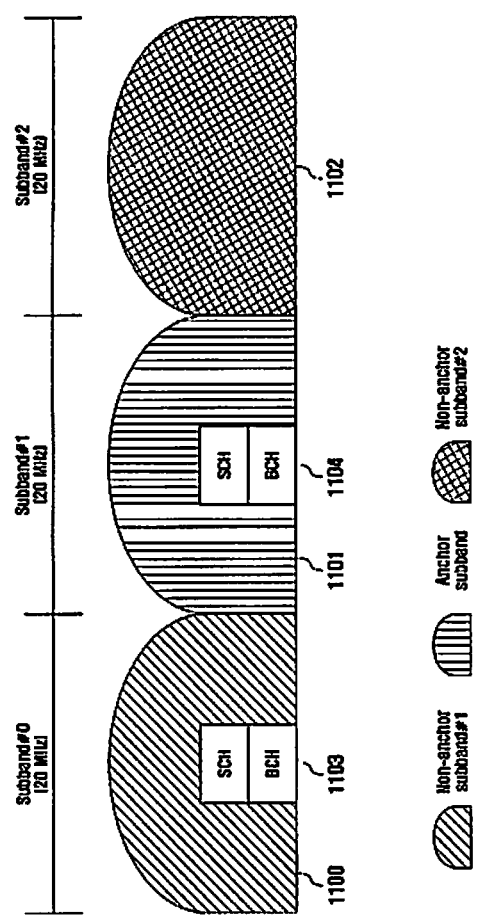
FIG. 11 is a diagram illustrating a structure of a system bandwidth of an LTE-A system according to the second embodiment of the present invention.

FIG. 11 is a diagram illustrating a structure of a system bandwidth of an LTE-A system according to the second embodiment of the present invention. In FIG. 11, the system bandwidth of the LTE-A system is 60 MHz, and the system band is composed of three 20 MHz subbands 1100, 1101, and 1102.

Referring to FIG. 11, the system band structure of the second embodiment is identically with that of the first embodiment in number of subbands except that the resource types of the respective subbands differ from each other. Unlike the first embodiment of FIG. 4, the subband #1 1101 is designated as an anchor subband, and the rest two subbands 1100 and 1102 are non-anchor subbands. In order for the LTE UEs to access the subband #0 1100 which is non-anchor subband, the subband #0 1100 is configured to transmit the SCH and BCH as denoted by the reference number 1103 in the middle of the bandwidth. In the second embodiment of the present invention, also the anchor subband is configured to transmit the SCH and BCH as denoted by the reference number 1104. Whereas, the subband #2 1102 is configured as the LTE-A dedicated subband without transmission of the SCH and BCH as shown in FIG. 4. Accordingly, the UEs can perform the cell search procedure on the subband #0 1100 and subband #1 1101 at initial system access.

The key difference between the anchor subband and the non-anchor subband is whether both the LTE-A specific system information 502 and the legacy LTE system information 501 are transmitted or only the legacy LTE system information 501 is transmitted in the SI transmission process.

Figure 12:
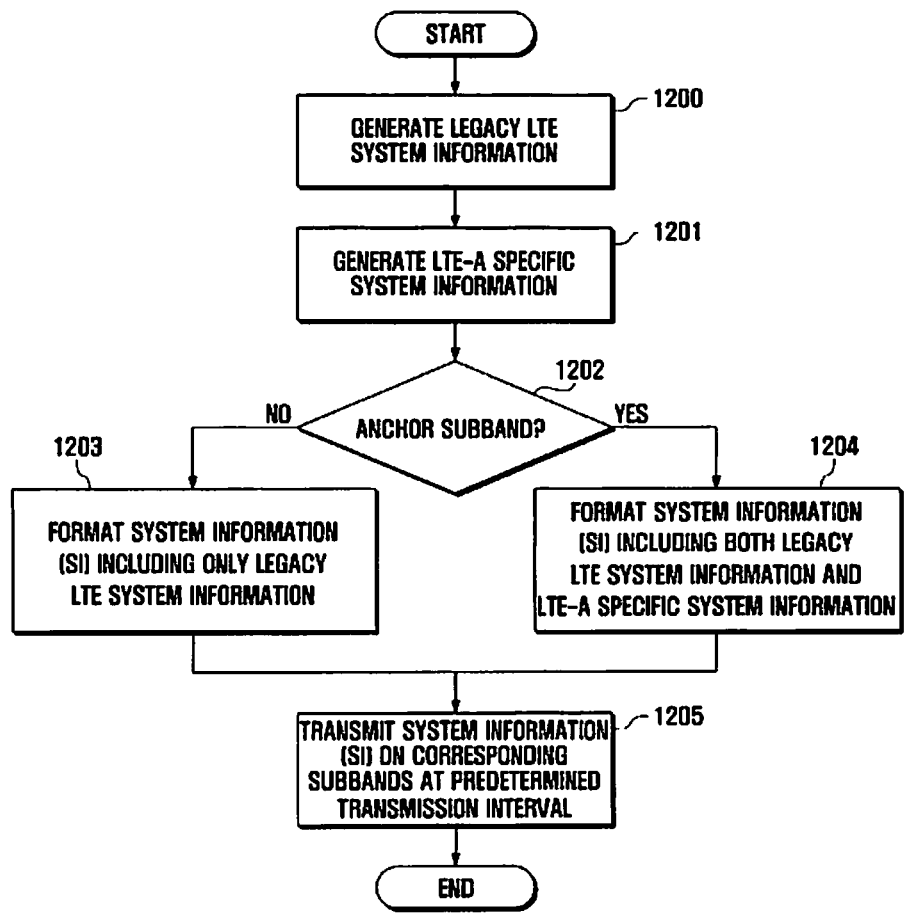
FIG. 12 is a flowchart illustrating a system information transmission procedure of the common channel transmission method in an LTE-A system according to the second embodiment of the present invention.

FIG. 12 is a flowchart illustrating a system information transmission procedure of the common channel transmission method in an LTE-A system according to the second embodiment of the present invention. In the system information transmission procedure according to the second embodiment of the present invention, the base station transmits the system information on the anchor and non-anchor subbands.

Referring to FIG. 12, the base station generates the legacy LTE system information 501 that can be received by the LTE UEs (including LTE-A UEs) as shown in FIG. 5 (1200). Next, the base station generates the LTE-A specific system information 502 that can be received by the LTE-A UEs (excluding LTE UEs) as shown in FIG. 5, the LTE-A specific system information 502 containing information on the center frequency and bandwidth of the anchor subband (1201).

Next, the base station determines whether the subband on which the system information (SI) 500 is transmitted is an anchor subband or a non-anchor subband (1202). If the subband is a non-anchor subband, the base station formats the system information (SI) 500 only with the legacy LTE system information 501 but not the LTE-A specific system information 502. In this case, since the SI channel carries only the legacy LTE system information 501, the SI overhead can be reduced in the non-anchor subband. Otherwise, if the subband is the anchor subband, the base station formats the system information (SI) 500 with both the legacy LTE system information 501 and the LTE-A specific system information 502 (1204). Accordingly, in order for the LTE-A UEs to acquire the mandatory system information required to access the LTE-A system, the LTE-A UEs must receive the SI 500 on the anchor subband. After formatting the SI 500, the base station transmits the SI 500 formatted for the anchor and non-anchor subbands at a predetermined transmission interval.

Figure 13:
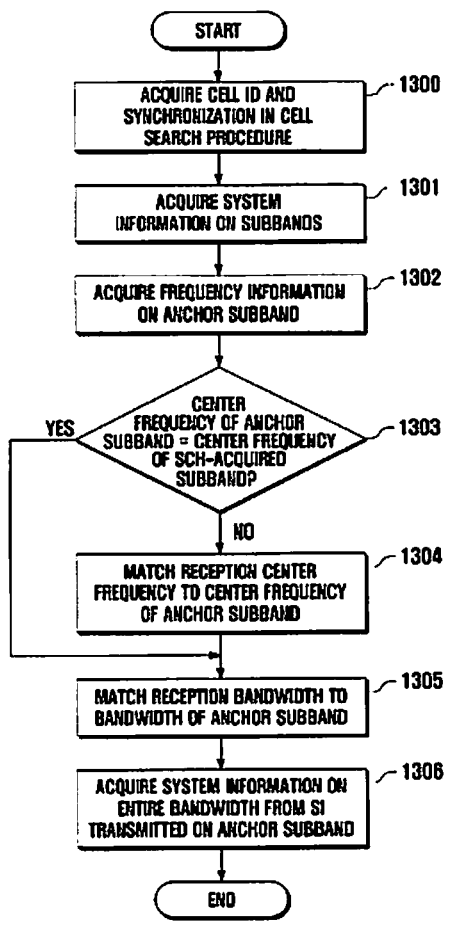
FIG. 13 is a flowchart illustrating a system information reception procedure of the common channel transmission method in an LTE-A system according to the second embodiment of the present invention.

FIG. 13 is a flowchart illustrating a system information reception procedure of the common channel transmission method in an LTE-A system according to the second embodiment of the present invention.

Referring to FIG. 13, a UE performs a cell search procedure to acquire the cell ID and frequency and frame synchronizations based on the SCH transmitted on the corresponding subband (1300). Next, the UE acquires the system information including the bandwidth of the acquired subband, the number of transmission antennas, and the random access channel configuration from the BCH and SI channel (1301). Next, the UE acquires the frequency information including the center frequency and bandwidth of the anchor subband from the system information (1302).

Next, the UE determines whether the center frequency of the anchor subband is identical with that of the subband on which the SCH is received (1303). That is, the UE determines whether the SCH is received on the anchor subband. If the center frequency of the anchor subband is not identical with that of the subband on which the SCH is received, the UE changes the center frequency of the reception bandwidth to the center frequency of the anchor subband (104). After changing the center frequency of the reception bandwidth, the changed center frequency becomes identical with the center frequency of the anchor subband, whereby the UE adjusts the reception bandwidth to be equal to the bandwidth of the anchor subband (1305) and acquires the system information about the entire system bandwidth from the LTE-A specific system information from the SI transmitted on the anchor subband (1306).

Once the LTE-A specific system information is acquired, the UE can camp on the bandwidth composed of at least one subband according to steps 603 to 605 of FIG. 6.

As described above, the common channel transmission and reception methods and apparatuses for an LTE-A system supporting carrier aggregation according to the present invention provide at least one LTE-A UE dedicated subband on which neither SCH nor BCH is transmitted, thereby improving downlink data transmission capacity.

Also, the common channel transmission and reception methods and apparatuses for an LTE-A system supporting carrier aggregation according to the present invention enables the LTE-A specific system information to be transmitted on an anchor subband but not on other non-anchor subbands, thereby reducing system information overhead and thus improving downlink data throughput.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for receiving a signal at a terminal in a mobile communication system, the method comprising:
   receiving, from a base station, configuration information indicating whether a broadcasting channel (BCH) for transmitting system information and a synchronization channel (SCH) for transmitting synchronization information are allocated in at least one subband;
   receiving, from the base station, control information on a downlink control channel; and
   receiving, from the base station, downlink data on a downlink data channel of a subband among the at least one subband based on the control information, the downlink data channel of the subband being identified based on the configuration information.

2. The method of claim 1, wherein receiving the configuration information comprises:
   receiving the configuration information on a higher layer signal.

3. The method of claim 1, wherein receiving the downlink data comprises:
   receiving, if the configuration information indicates that the BCH and the SCH are not allocated in the subband among the at least one subband, the downlink data on a resource region for the BCH and the SCH in the subband among the at least one subband.

4. The method of claim 1, further comprising identifying a subband for camping based on a message received from the base station,
   wherein the subband among the at least one subband includes the identified subband for camping.

5. A method for transmitting a signal at a base station in a mobile communication system, the method comprising:
   transmitting, to a terminal, configuration information indicating whether a broadcasting channel (BCH) for transmitting system information and a synchronization channel (SCH) for transmitting synchronization information are allocated in at least one subband;
   transmitting, to the terminal, control information on a downlink control channel; and
   transmitting, to the terminal, downlink data on a downlink data channel of a subband among the at least one subband; based on the control information, the downlink data channel of the subband being identified based on the configuration information.

6. The method of claim 5, wherein transmitting the configuration information comprises:
   transmitting the configuration information via a higher layer signal.

7. The method of claim 5, wherein transmitting the downlink data channel comprises:
   transmitting, to the terminal, if the configuration information indicates that the BCH and the SCH are not allocated in the subband among the at least one subband, the downlink data on a resource region for the BCH and the SCH in the subband among the at least one subband.

8. The method of claim 5, further comprising transmitting, to the terminal, a message including information on a subband for camping,
   wherein the subband among the at least one subband includes the identified subband for camping.

9. A terminal of a mobile communication system, the terminal comprising:
   a transceiver which transmits and receives signals to and from a base station; and
   a control unit configured to receive, from a base station, configuration information indicating whether a broadcasting channel (BCH) for transmitting system information and a synchronization channel (SCH) for transmitting synchronization information are allocated in at least one subband, to receive, from the base station, control information on a downlink control channel, and to receive downlink data on a downlink data channel of a subband among the at least one subband based on the control information, the downlink data channel of the subband being identified based on the configuration information.

10. The terminal of claim 9, wherein the control unit is further configured to receive the configuration information via a higher layer signal.

11. The terminal of claim 9, wherein the control unit is further configured to receive, if the configuration information indicates that the BCH and the SCH are not allocated in the subband among the at least one subband, the downlink data on a resource region for the BCH and the SCH in the subband among the at least one subband.

12. The terminal of claim 9, wherein the control unit is further configured to identify a subband for camping based on a message received from the base station,
   wherein the subband among the at least one subband includes the identified subband for camping.

13. A base station of a mobile communication system, the base station comprising:
   a transceiver which transmits and receives signals to and from a terminal; and
   a control unit configured to transmit, to a terminal, configuration information indicating whether a broadcasting channel (BCH) for transmitting system information and a synchronization channel (SCH) for transmitting synchronization information are allocated in at least one subband, to transmit, to the terminal, control information on a downlink control channel to the terminal, and to transmit, to the terminal, downlink data on a downlink data channel of a subband among the at least one subband based on the control information, the downlink data channel of the subband being identified based on based on the configuration information and the control information.

14. The base station of claim 13, wherein the control unit is further configured to transmit the configuration information via a higher layer signal.

15. The base station of claim 13, wherein the control unit is further configured to transmit, to the terminal, if the configuration information indicates that the BCH and the SCH are not allocated in the subband among the at least one subband, the downlink data on a resource region for the BCH and the SCH in the subband among the at least one subband.

16. The base station of claim 13, wherein the control unit is further configured to transmit, to the terminal, a message including information on a subband for camping,
   wherein the subband among the at least one subband includes the identified subband for camping.

* * * * *